United States Patent [19]

Meadors, Jr.

[11] 3,914,691

[45] Oct. 21, 1975

[54] REPOSITIONING OF EQUALIZER TAP-GAIN COEFFICIENTS

[75] Inventor: Howard Clarence Meadors, Jr., Wayside, N.J.

[73] Assignee: Bell Telephone Laboratories, Incorporated, Murray Hill, N.J.

[22] Filed: Aug. 21, 1974

[21] Appl. No.: 499,123

[52] U.S. Cl. .................... 325/42; 333/18; 325/324
[51] Int. Cl.² .................... H04B 1/00
[58] Field of Search .................... 325/42, 60, 323–326, 325/472–477; 333/18; 179/15 AE

[56] References Cited

UNITED STATES PATENTS 3,727,136 4/1973 Schroeder .................... 325/42

*Primary Examiner*—Albert J. Mayer
*Attorney, Agent, or Firm*—J. P. Kearns

[57] ABSTRACT

Start-up performance of an automatic transversal equalizer is enhanced when known, but unsynchronized, pseudorandom test words having substantially as many elements as there are equalizer taps are correlated at the receiver location in a digital data transmission system to obtain an ordered set of tap-gain coefficients of sufficient precision to open the received eye pattern. The largest tap-gain coefficient of the ordered set thus derived is rapidly ascertained and aligned with a predetermined reference tap position entirely by digital means. The technique is readily adapted to phase-modulated and quadrature amplitude-modulated data systems where quadrature-related coefficient sets, i.e., the coefficients are complex numbers, are required.

5 Claims, 2 Drawing Figures

REPOSITIONING OF EQUALIZER TAP-GAIN COEFFICIENTS

FIELD OF THE INVENTION

This invention relates to automatic equalizers for compensating distorting data transmission channels and particularly to the provision of rapid selection of the largest tap-gain coefficient during startup operation and the positioning of such tap-gain coefficient at the reference tap location.

BACKGROUND OF THE INVENTION

Automatic equalizers are necessary to high-speed data transmission over bandlimited channels with unknown transmission characteristics. The equalizer generally comprises a transversal filter with adjustable tap-gain coefficients. These coefficients are set to initial values derived from test signals transmitted over the transmission channel prior to message transmission. These initial values are later updated during message transmission on an adaptive basis.

An important arrangement for fast startup of data transmission systems is disclosed by K. H. Mueller and D. A. Spaulding in their joint U.S. Patent No. 3,715,666 issued Feb. 6, 1973 and denominated "cyclic equalization". According to their invention, matching pseudorandom periodic test sequences equal in length to the number of required tap-gain coefficients are generated at transmitter and receiver locations and are correlated without regard to synchronization to derive an ordered set of tap-gain coefficients. Typically, this ordered set of coefficients includes a dominant magnitude which must be shifted into alignment with the reference tap on the equalizer prior to message data transmission.

It is an object of this invention to select and shift the largest, i.e., dominant, tap-gain coefficient resulting from equalizer startup procedures for digital data transmission systems into alignment with the reference tap location.

It is another object of this invention to modify multirow digital storage of multibit coefficient values for control of tap-gains in transversal equalizers to provide for the selection and shifting of the largest such coefficient of a finite group into alignment with the location of a reference tap on such equalizer.

SUMMARY OF THE INVENTION

According to this invention, an array of tap-gain coefficients stored as binary words in a digital memory are shifted sequentially in pairs into a comparison relationship to determine at each comparison the larger magnitude. Both the cumulative "larger" magnitudes and the coefficients are returned to storage. When all coefficient values have been compared, the last-stored "larger" magnitude is the "largest" of the set of values. In a second comparison operation, the coefficient magnitudes are again compared with the "largest" magnitude until its equal is found. In a final operation all tap-gain coefficients are cycled until the largest coefficient magnitude is shifted into the reference location.

Where orthogonal sets of tap-gain coefficients are stored in separate memories, it is convenient to connect the two memories in series and thus to obtain the largest coefficient of both orthogonal sets. It has been found in practice that the dominant coefficients in each set track each other closely enough to generate quadrature-related open eye patterns.

The comparator for determining which of two binary words is the larger can advantageously comprise a binary full adder with an inverting input. When a carry digit is generated in the output of the adder, the noninverted input is larger and this carry provides a control signal for a transfer switch to deliver the larger of the two words being compared to a holding register.

The largest coefficient is found in one symbol interval of rotation of all the stored coefficients through comparators. Cycling the largest coefficient to the reference position requires only one more symbol interval.

DESCRIPTION OF THE DRAWING

The above objects and features of this invention will be more fully understood and appreciated from a consideration of the following detailed description and the drawing in which.

DETAILED DESCRIPTION

Figure 1:
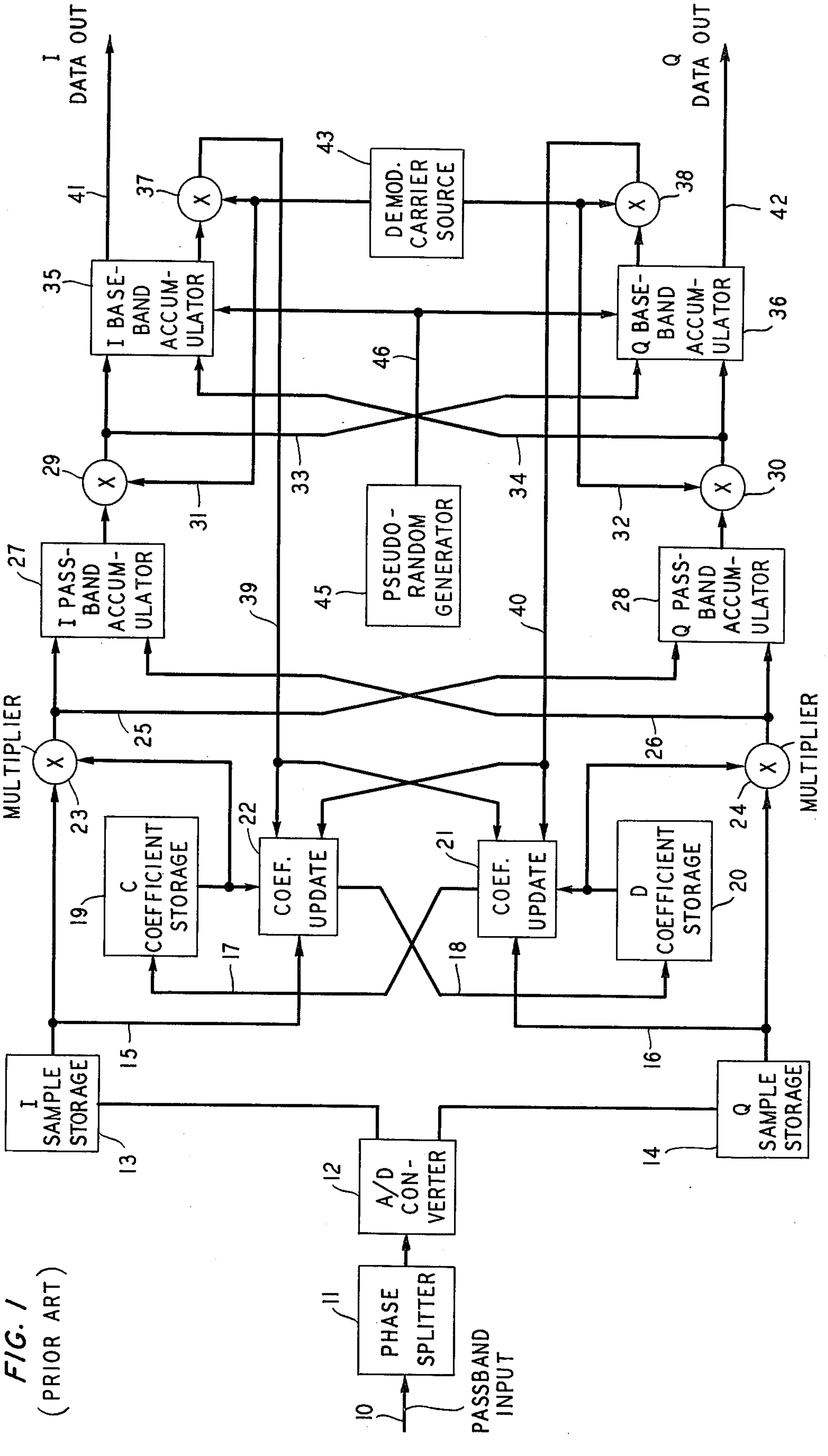
FIG. 1 (PRIOR ART)
FIG. 1 is a block schematic diagram of a known passband equalizer-demodulator to which the tap-gain coefficient positioner according to this invention is applicable.

FIG. 1 is a simplified block schematic diagram of the equalizer-demodulator at a receiver location for a quadrature amplitude-modulated (QAM) digital data transmission system. The equalizer-demodulator is described in detail in the copending patent application, Ser. No. 437,978 filed on Jan. 30, 1974 by D. D. Falconer, K. H. Mueller, J. Salz and D. A. Spaulding now Pat. No. 3,878,468 issued Apr. 15, 1975.

In one specific embodiment of a QAM data transmission system to which this invention is applicable, 4 paralleled information bits are transmitted in each symbol interval at a symbol rate of 2400 baud to achieve an equivalent binary data transmission rate of 9600 bits per second. During an arbitrary symbol interval, the 4 bits to be transmitted are encoded into two data signals, each of which can take on one of four values from the set $\{\pm 3, \pm 1\}$. These two data signals, after baseband filtering, modulate quadrature 1650-Hz carrier waves. The modulated signals are added together to form a complex transmission channel signal.

In the receiver, as shown in FIG. 1, the incoming passband received signal on line 10 is split into its quadrature components in phase-splitter 11 by a Hilbert transformation and is then sampled digitally in analog-to-digital converter 12 to yield 10-bit numbers representing each of the in-phase (I) and quadrature-phase (Q) components of the received data signal. In the illustrative embodiment, I sample storage 13 and Q sample storage 14 each store the 32 most recent I and Q samples. Storages 13 and 14 are bulk memories each of whose storage addresses represent a transversal equalizer tap position.

Associated with each tap are two 24-bit tap-gain coefficients separately stored in C coefficient storage 19 and D coefficient storage 20. Both the C and D coefficients are derived from combined errors measured in the I and Q demodulators as indicated in FIG. 1 at multipliers 37 and 38. The respective C and D coefficients are updated in normal operation in accordance with the I and Q errors on leads 39 and 40 in coefficient update blocks 21 and 22 as shown. Update blocks 21 and 22 have data sample inputs on leads 15 and 16 and error inputs on leads 39 and 40. Their outputs are connected to C and D coefficient storages 19 and 20 over leads 17 and 18.

The 10-bit received signal samples stored in storages 13 and 14 and the 12 most significant bits of the associated coefficients are multiplied in multipliers 23 and 24 as shown. The 12 bits of lesser significance are averaging bits in an augmented 24-bit representation, and they serve the purpose of absorbing minor perturbations in the coefficient updating. The products obtained from multipliers 23 and 24 are summed in respective I and Q passband accumulators 27 and 28. The cross-connections of leads 25 and 26 should be noted because each of the I and Q equalizer outputs includes both I and Q transmitted signal components, as more fully explained in the Falconer, et al. appplication. The equalized passband signal values stored in accumulators 27 and 28 are 12-bit binary numbers.

The passband values stored in accumulators 27 and 28 are demodulated to baseband by multiplications by 9-bit representations of respective sines and cosines of the demodulating carrier wave generated in demodulating carrier-wave source 43 by way of leads 31 and 32. The baseband outputs of demodulators 29 and 30 are cross coupled by paths including leads 33 and 34, as shown in FIG. 1, into I and Q baseband accumulators 35 and 36. The resulting baseband outputs on leads 41 and 42 after threshold slicing operations are converted into received binary data. The excess of the accumulated values at the slicing levels constitutes an error amount which can be expressed in 12-bit error words. The error words are multiplied by the sine and cosine of the demodulating carrier wave in multipliers 37 and 38 to bring them up to passband level on leads 39 and 40. The passband error values are then employed in coefficient updating blocks 2l and 22 to adjust the C and D coefficient values stored in memories 19 and 20.

The preceding description of a known equalizer-demodulator for a QAM data transmission system applies to the normal message data reception mode. Due to the variability of the transmission characteristics of the channels generally available for data transmission, it is virtually imperative that the receiver be conditioned for message data reception by the transmission of pre-arranged startup sequences including pure carrier bursts, dotting sequences and pseudorandom sequences. Where pseudorandom sequences are employed as reference patterns during startup, identical sequences are generated at both transmitter and receiver locations. For this purpose, psuedorandom generator block 45 is shown in FIG. 1 connected by way of lead 46 into baseband accumulators 35 and 36. In this event the error signals on leads 39 and 40 are derived from a comparison between the outputs of baseband accumulators 35 and 36 and receiver pseudorandom sequences generated in pseudorandom generator 45, rather than from normalized data decisions.

The teachings of the aforementioned Mueller, et al. patent are employed to advantage during startup of a high-speed QAM data transmission system by making the number of bits in the matching pseudorandom startup sequences equal to the number of taps or storage locations in the equalizer. In this way an ordered set of tap-gain coefficients can be derived without first synchronizing the transmitter and receiver pseudorandom sequences. Prior to initialization the C and D tap-gain coefficients can be reset to a predetermined reference state, such as, all-zero, in order to speed up the convergence process. Once the ordered set of coefficients is obtained during the transmission of only two or three repetitions of the pseudorandom sequence, there remains the problem of identifying the largest tap-gain coefficient and cyclically shifting the entire ordered set of coefficients to align the largest one with the reference tap or storage address.

Figure 2:
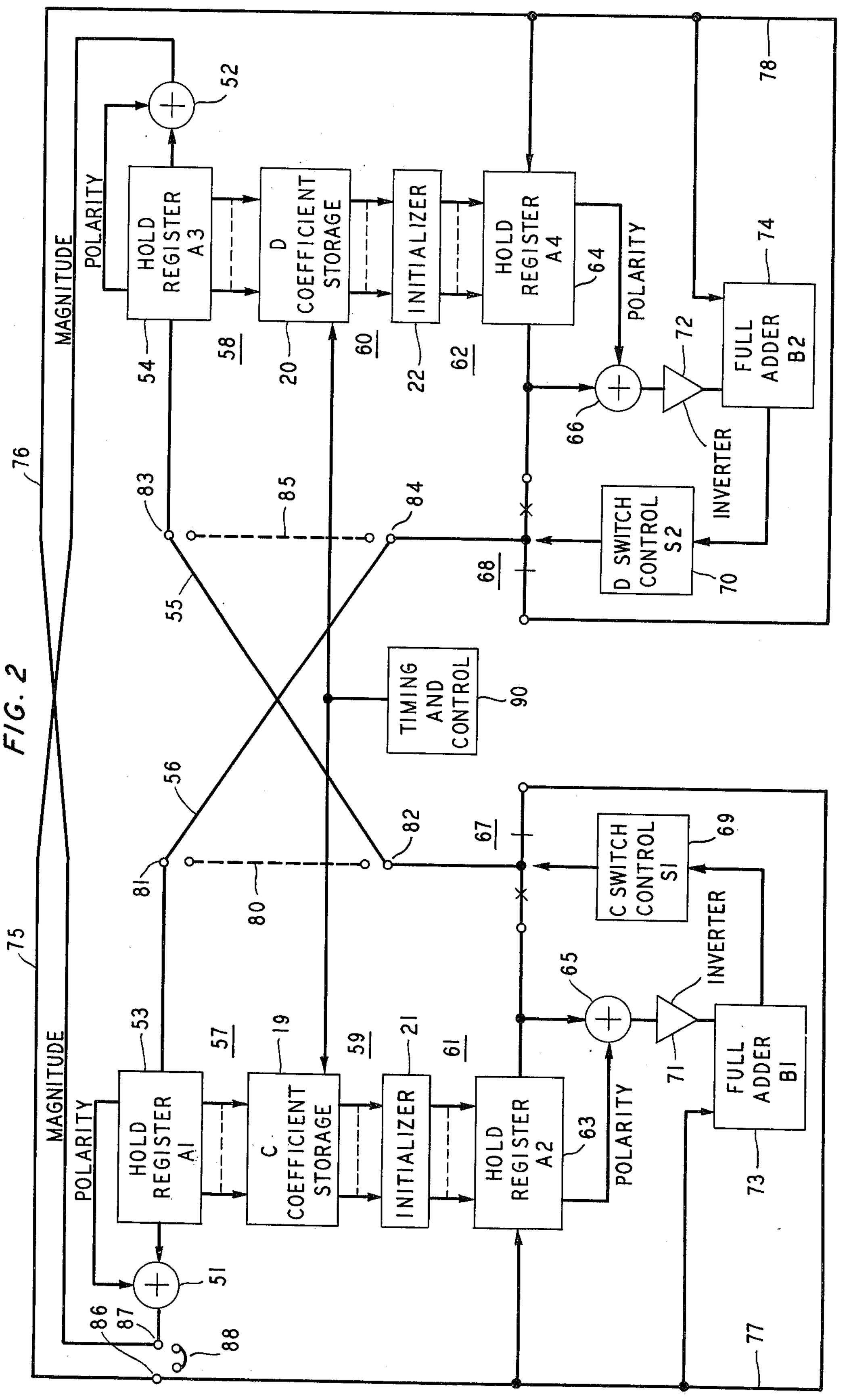
FIG. 2 is a block schematic diagram of the tap-gain coefficient positioner for fast startup of an automatic equalizer useful according to this invention in a digital data transmission system.

This invention solves the identification and shifting problem in a unique way with a rather minor modification of C and D coefficient storages 19 and 20. FIG. 2 illustrates the required modifications according to this invention in the type of digital equalizer outlined above.

As shown in FIG. 2, C and D coefficient storage memories 19 and 20 are augmented by input hold registers 53 and 54 (also designated A1 and A3 for convenience in description of operation), output hold registers 63 and 64 (also designated A2 and A4), initializers 21 and 22, switchable cross-connection paths 55 and 56 between registers A1–A4 and A2–A3, fixed cross-connection paths 75 and 76 between the same registers, binary adders 73 and 74, timing and control unit 90, transfer switches 67 and 68 and switch controls 69 and 70 (also designated 51 and 52). Many of these elements, including registers 53, 54, 63 and 64, may already be associated with the storage units 19 and 20 and are assigned new functions.

During rapid startup of the illustrative data transmission system, a 32-bit ideal reference signal is used in each of the I and Q channels. The C and D coefficient storage memories 19 and 20 are provided with 32 storage locations each capable of storing a 24-bit word divided into "coefficient" bits and "averaging" bits. The 12 most significant bits of the coefficient words are used for multiplication with the signal samples. The remaining 12 bits are those normally affected by updating in accordance with the data decision-directed error signals. During startup, however, no updating occurs and the averaging bits are not needed. Their storage locations are turned to account in determining the largest coefficient in the illustrative embodiment.

At the completion of the ideal reference phase, i.e., the phase of comparing transmitter and receiver generated matching pseudorandom sequences, a two-symbol interval period is utilized to locate and identify the largest tap-gain coefficient in either of C and D coefficient storages 19 and 20 and then to reposition this largest coefficient to the center of the storage in which it was initially located. In order to do this, the averaging bits of the augmented coefficients are discarded.

At the beginning of the first of the two-symbol intervals, a +0 (100000000000 in binary code) is entered by way of a reset operation in initializers 21 and 22 into each of registers A2 and A4 in the position normally reserved for the averaging bits of the first of the C and D tap coefficients. This number now represents the largest coefficient magnitude yet encountered. Switches 67 and 68 are moved to their respective make positions (indicated by the $x$), thereby connecting the outputs of registers A2 and A4 to crosslinks 55 and 56. The contents of register A2 are thus transferred to register A3 and the contents of register A4, to register A1 in a first subinterval. In a next subinterval the first C and D coefficients are entered into registers A2 and A4 without any initializing operation. At this instant the even-ordered holding registers contain tap coefficients and the odd-ordered registers contain the so-far-encountered largest coefficient magnitude. Now the coefficient contents of the even-ordered holding registers are simultaneously and serially transferred through exclusive-OR gates 65 and 66 (controlled by the polarity bits of the coefficients) and inverters 71 and 72 into full adders 73and 74 and also through the make portions of transfer switches 67 and 68 and crosslinks 55 and 56 into odd-ordered holding registers A1 and A3. Now also while the coefficient contents of the even-ordered registers are being read into the odd-ordered registers, the former largest coefficients are read in parallel into the C and D storage locations and their magnitudes are serially read out through exclusive-OR gates 51 and 52 (controlled by the polarity bits of the numbers being read out) and looparound leads 75 and 76 to the even-ordered holding registers and into the other inputs of adders 73 and 74. The outputs of adders B1 and B2 are 1 or 0 according to whether or not the latest actual coefficient is equal to or greater than the so-called largest coefficient. In the former case switches 67 and 68 under the control of switch control 69 and 70 are operated to the break portion (indicated by the vertical slash) and the actual coefficients are looped around to the same odd-ordered holding registers to be the new largest coefficients. In the latter case switches 67 and 68 remain in the make positions and the former largest coefficients are transferred to the odd-ordered registers.

The second actual coefficients are stepped down in parallel into the even-ordered holding registers A2 and A4. All coefficients in storages 19 and 20 are moved down and the contents of odd-ordered registers A1 and A3 are entered into the tops of storages 19 and 20. The above procedure is repeated with respect to the second actual coefficient and the previous largest coefficient in the next subinterval. In as many subintervals of the first symbol interval as there are storage locations in storages 19 and 20 the procedure outlined is repeated until all the C and D coefficients have been circulated through storages 19 and 20 and have been restored to their original locations. The cumulative largest coefficients are interspersed in the averaging locations.

In the second symbol interval of the identification and repositioning phase, crossover links 55 and 56 are replaced by broken line links 80 and 85 between terminals 81–82 and 83–84. In effect, each of storages 19 and 20 is looped back on itself so that, for example, whatever is read out of hold register A4 from storage 20 is read into hold register A3 for reinsertion into the other end of storage 20. The same procedure performed in the first subinterval is repeated to the extent that all the C coefficients stored in storage 20 and all the D coefficients stored in storage 19 are interchanged and compared in full adders B1 and B2. The result is that the actual tap coefficient which is equal to or greater than the "largest" value found in the previous subinterval is found and placed in holding register A1 or A3, depending on whether such largest actual tap coefficient is a C or D coefficient. The comparison is then stopped. On the average only half the tap coefficients need be compared to locate the largest. Due to the symmetry of the in-phase and quadrature equalizer structure and the contrast in values between the reference-tap value and all others, the dominant C and D tap coefficients are likely to track each other within one or two tap locations. Thus, when the largest C coefficient, for example, is held in register A1, it is probable that the largest D coefficient is held in register A3, or is at most only one or two tap positions away. This precision is sufficient to provide open initial eye patterns.

During the final half of the second symbol interval used for identifying the largest tap coefficient, the tap coefficients are circulated through storage 19 and 20 at half-speed with the result that the largest tap coefficients residing in hold registers A1 and A3 are moved to the center storage locations in each of storages 19 and 20 corresponding to the center taps on the equalizer.

Timing and control circuits are not explicitly shown in FIG. 2, because it is believed that anyone skilled in the art given the preceding description of the present invention can readily supply the appropriate control functions. Such timing and control circuits as required are assumed to be implicit in storages 19 and 20 and holding registers 53, 54, 63 and 64.

Although the described arrangement presupposes a quadrature-amplitude-modulation system, it will be apparent to one skilled in the art that a single-channel data transmission system using cyclic equalization can have the largest tap coefficient identified and repositioned in accordance with the principles of this invention. For a single-channel repositioning system, FIG. 2 can be modified by placing jumper link 80 between terminals 81 and 82 and jumper link 88 between terminals 86 and 87 on the assumption that the coarse tap coefficients obtained by correlating two ideal matching pseudorandom test sequences have been stored in storage 19.

It will be understood that various other embodiments and modifications can be made by those skilled in the art without departing from the spirit and scope of the invention.

What is claimed is:

1. In combination with a multitap automatic transversal equalizer for which an initial ordered set of tap-gain coefficient words has been determined but the largest of which is required to be aligned with a preferred reference tap location, a multiword storage medium for a sequence of tap-gain coefficient words in digital form, input and output holding registers for said storage medium, means for comparing the difference in magnitude between words held in the respective input and output registers, switching means responsive to said comparing means for directing the contents of either the output or input registers into the input register in accordance with the larger magnitude thereof, means for sequentially transferring the coefficient words into said output register until all such coefficient words have circulated therethrough for comparison with the contents of said input register to determine the largest such coefficient word, and means for shifting all said coefficient words through said multiword medium by a predetermined amount such that said largest coefficient word is stored in a position corresponding to the preferred reference location of said equalizer.

2. The combination defined in claim 1 in which said transversal equalizer employs more than one ordered set of tap-gain coefficient words requiring the alignment of the largest of at least one set with a preferred reference tap location, said multiword storage medium comprises separate storage sections for each of said ordered sets of tap-gain coefficients, input and output holding registers are provided for each of said storage sections, said comparing means includes a section for each section of said storage medium, said switching means directs the contents of said output registers associated with one section of said storage medium to an input register of another section of said storage medium, said transferring means circulates all said coefficient words through all sections of said storage medium, and said shifting means aligns the largest coefficient of said ordered sets with a position corresponding to a preferred reference location on said equalizer.

3. The combination defined in claim 1 in which said comparing means comprises a two-input serial full adder, and an inverter in series with one input of said adder.

4. The combination defined in claim 1 in which said comparing means comprises a two-input serial full adder, an inverter in series with one input of said adder, the presence of a carry bit in output of said adder indicating the dominance of the noninverted input over the inverted input, and means for applying the carry output of said adder to said switching means.

5. In combination with a multitap automatic transversal equalizer having separate in-phase and quadrature branches for which initial ordered sets of tap-gain coefficient words have been determined but the largest coefficient word is required to be aligned with a preferred reference tap location, multiword storage media for each of the in-phase and quadrature sequences of tap-gain coefficient words in digital form, input and output holding registers for each of said multiword storage media, means for comparing the difference in magnitude between words held in the input register associated with the one storage medium and the output register associated with the other storage medium, switching means separately responsive to each of said comparing means for directing the contents of either the input or output registers applied to a particular comparing means into the other input register in accordance with the larger input magnitude thereto, means for sequentially transferring the coefficient words in each of said storage media through the associated output registers until all such coefficient words have been compared with the contents of an input register to determine the largest coefficient word among all such words, and means for shifting all said coefficient words through said multiword storage media by a predetermined amount such that the largest coefficient word of said sets of coefficient words is stored in a position corresponding to the preferred reference location of said equalizer.

* * * * *